United States Patent [19]
Williams

[11] 3,756,334
[45] Sept. 4, 1973

[54] SELF-PROPELLLED SNOW VEHICLE

[76] Inventor: Verril E. Williams, 4923 Escobedo Dr., Woodland Hills, Calif. 91364

[22] Filed: Oct. 8, 1971

[21] Appl. No.: 187,765

[52] U.S. Cl. ............................ 180/5 R, 280/112 A
[51] Int. Cl. ............................................ B62m 27/02
[58] Field of Search.................... 280/28, 16, 112 A; 180/5 R, 6 R

[56] References Cited
UNITED STATES PATENTS

| | | | |
|---|---|---|---|
| 2,819,093 | 1/1958 | Geiser | 280/112 A |
| 3,583,507 | 6/1971 | Trautwein | 180/5 R |
| 3,140,752 | 7/1964 | Feu | 180/5 R |
| 497,174 | 5/1893 | Hartling | 280/28 |
| 1,054,673 | 3/1913 | Charles | 180/6 R |
| 3,650,341 | 3/1972 | Asmussen | 180/5 R |
| 3,361,436 | 1/1968 | Williams | 280/16 |

Primary Examiner—Richard J. Johnson
Attorney—Robert E. Geauque

[57] ABSTRACT

A snow vehicle which employs an endless track assembly to propel the vehicle upon snow, the endless track assembly being driven by a motor which is contained within a motor housing, the front or nose section of the vehicle supports a pair of spaced apart skis, a passenger compartment located intermediate the nose section and the motor housing, the passenger compartment being pivotable with respect to the motor housing and the nose section.

6 Claims, 12 Drawing Figures

INVENTOR.
VERRIL E. WILLIAMS
BY R.E. Geargue
ATTORNEY

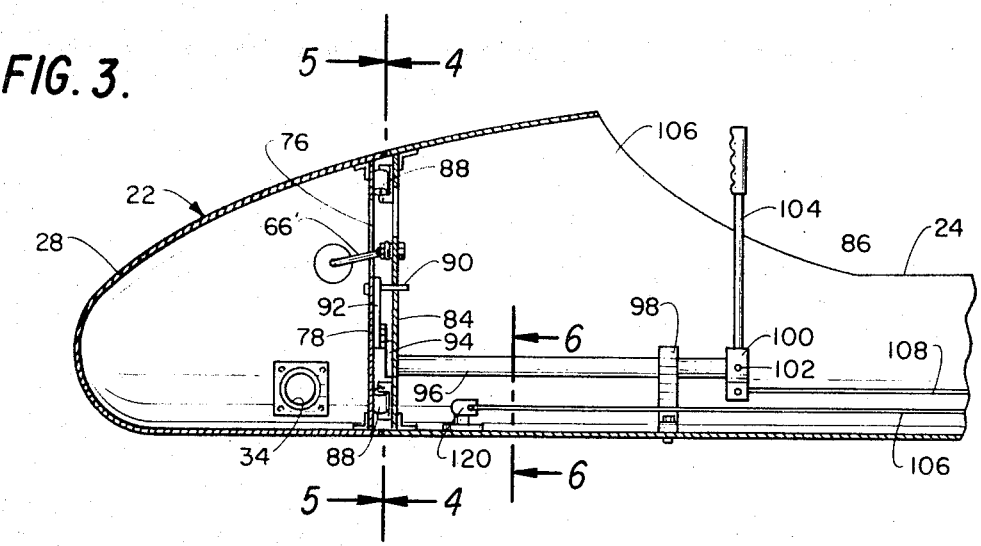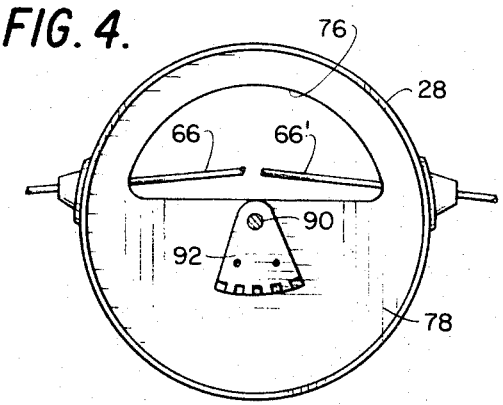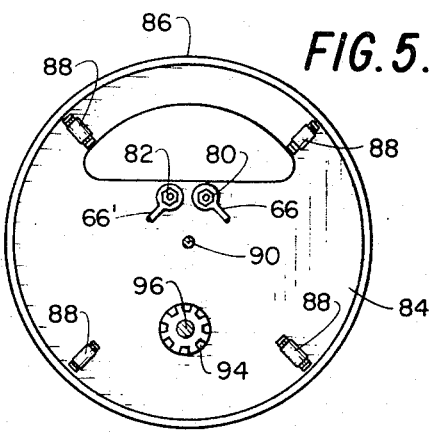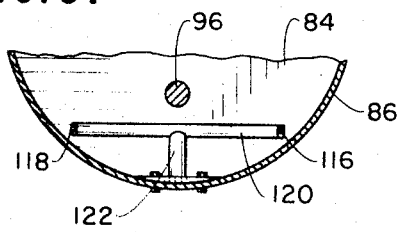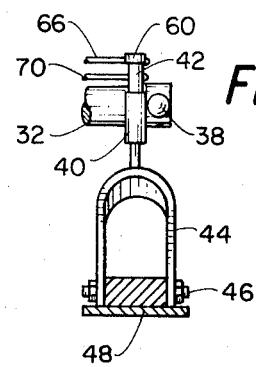

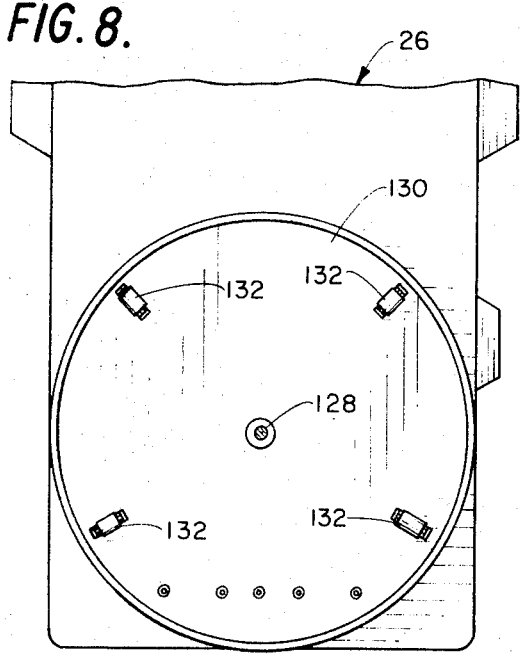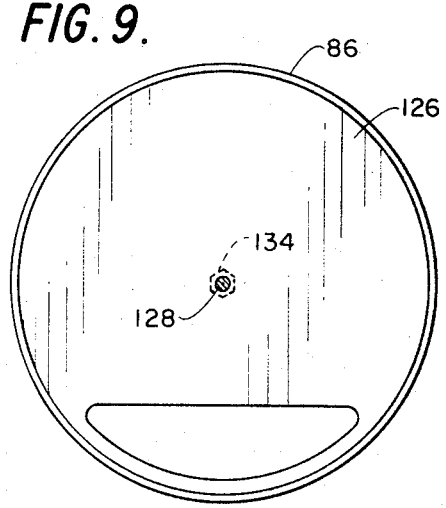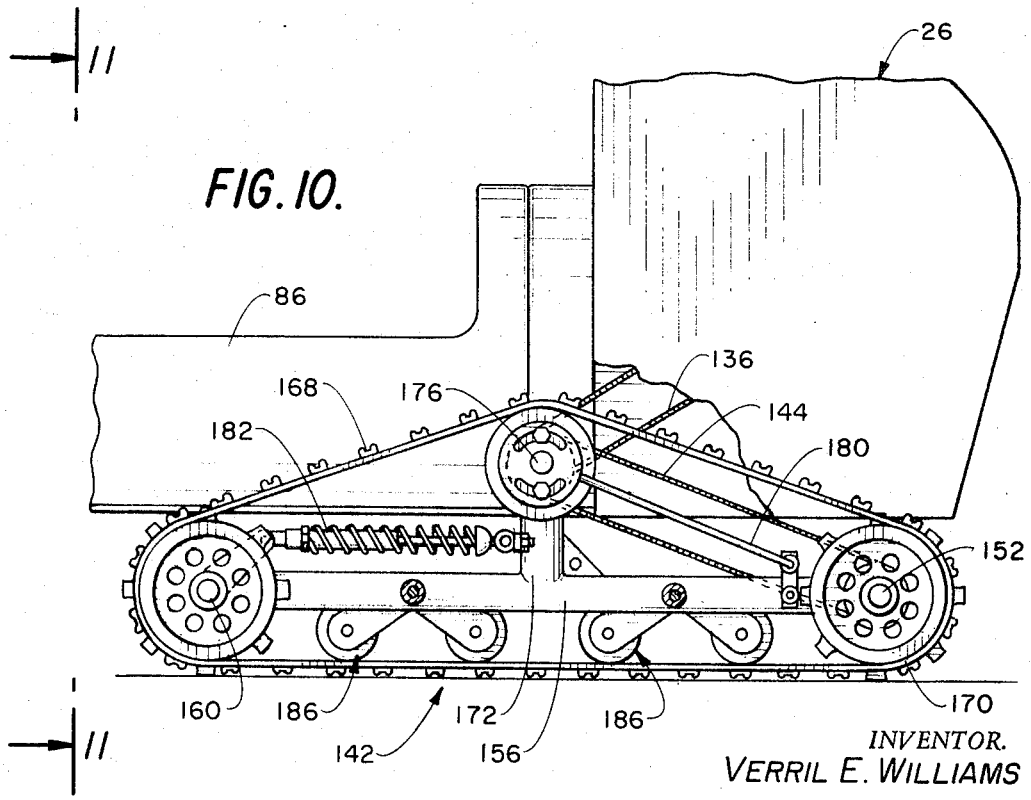

INVENTOR.
VERRIL E. WILLIAMS

SELF-PROPELLLED SNOW VEHICLE

BACKGROUND OF THE INVENTION

Within the past few years, snowmobiles have come into extremely widespread use. Basically, the snowmobile employs the use of an endless track assembly and skis to move the vehicle upon snow. The passenger compartment is fixed with respect to the endless track assembly and the skis so that when the vehicle is in the process of making a sharp turn, the vehicle may be inclined to turn on its side (roll over). Such snowmobile accidents are becoming quite common and account for a substantial number of injuries every year. It would be desirable to design a snowmobile which was built to resist turning over in sharp turns.

Additionally, snow vehicles of the prior art have found it difficult to move laterally upon an incline. Snow vehicles of the prior art, when traversing across a hill, tend to slide laterally down toward the bottom of the hill. Such lateral movement besides being undesirable can be dangerous. It would be desirable to design a snow vehicle which employed some means in combination with the propelling structure so as to keep the vehicle from moving laterally upon an incline.

Further, snow vehicles of the prior art have been quite complex in construction. Such complexity substantially increases the cost of manufacture of the vehicle. It would be desirable to design a snow vehicle which was substantially less complex in construction and therefore could be manufactured at a price which is accessible to a greater number of people.

SUMMARY OF THE INVENTION

The snow vehicle of this invention is adapted to employ the use of an endless track assembly which is driven by means of a motor located within a motor housing. The motor housing is connected to a passenger compartment. A nose or front section is connected to the opposite end of the passenger compartment. A ski is located on each side of the nose section and is to come into contact with the snow covered terrain. The skis are to be pivotable and tiltable with respect to the nose section to effect turning of the vehicle in a particular direction. A control handle is located within the passenger compartment to result in this pivoting and turning movement of the skis. Upon the skis being pivoted and tilted so as to make a left turn, the passenger compartment is caused to pivot counterclockwise with respect to the nose section and the motor housing. In other words, the overall center of gravity of the passengers and the passenger compartment is laterally displaced to the left and lowered so as to resist the inherently produced torque which tends to cause the vehicle to tip over on its side. In a similar manner, upon the skis being pivoted so that the vehicle will make a right turn, the passenger compartment pivots in a clockwise direction with respect to the nose section and the motor housing.

Connected with each of the endless track units of the endless track assembly is a thin plate which is adapted to come into continuous engagement with the snow covered terrain. Each of the thin plates are to be adjustable so as to vary the amount of contact with the terrain. It is the function of each of the plates to tend to resist lateral sliding movement of the vehicle when traversing across an incline such as a hill.

Located within the passenger compartment is a brake actuating means which is capable of effecting operation of a brake assembly within each of the tractor units. The brake actuating means facilitates simultaneous operation of each of the brake assemblies and also facilitates individual actuation of each of the brake assemblies.

BRIEF DESCRIPTION OF THE DRAWINGS

FIG. 3 is a fragmentary, cross-sectional view of a portion of the structure of the vehicle of this invention taken along 3—3 of FIG. 1;

FIG. 4 is a cut-away view taken along line 4—4 of FIG. 3;

FIG. 5 is a cut-away view taken along line 5—5 of FIG. 3;

FIG. 6 is a fragmentary, cross-sectional view taken along line 6—6 of FIG. 3;

FIG. 7 is a partly-in-section view of the ski connection employed within this invention taken along line 7—7 of FIG. 1;

FIG. 8 is a cut-away view taken along line 8—8 of FIG. 1;

FIG. 9 is a cut-away view taken along line 9—9 of FIG. 1;

FIG. 10 is a side view of one of the tractor units and its associated motor housing and passenger compartment of the vehicle of this invention;

DETAILED DESCRIPTION OF THE SHOWN EMBODIMENT

Figure 1:
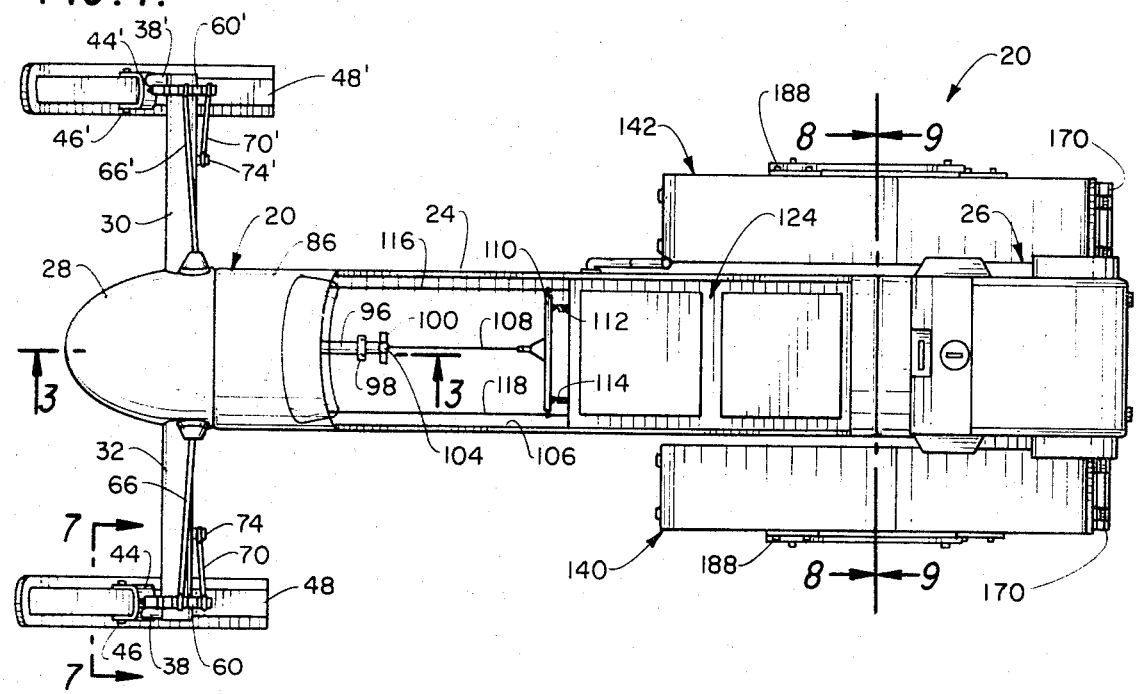
FIG. 1 is an overall plan view of the vehicle of this invention.
Figure 2:
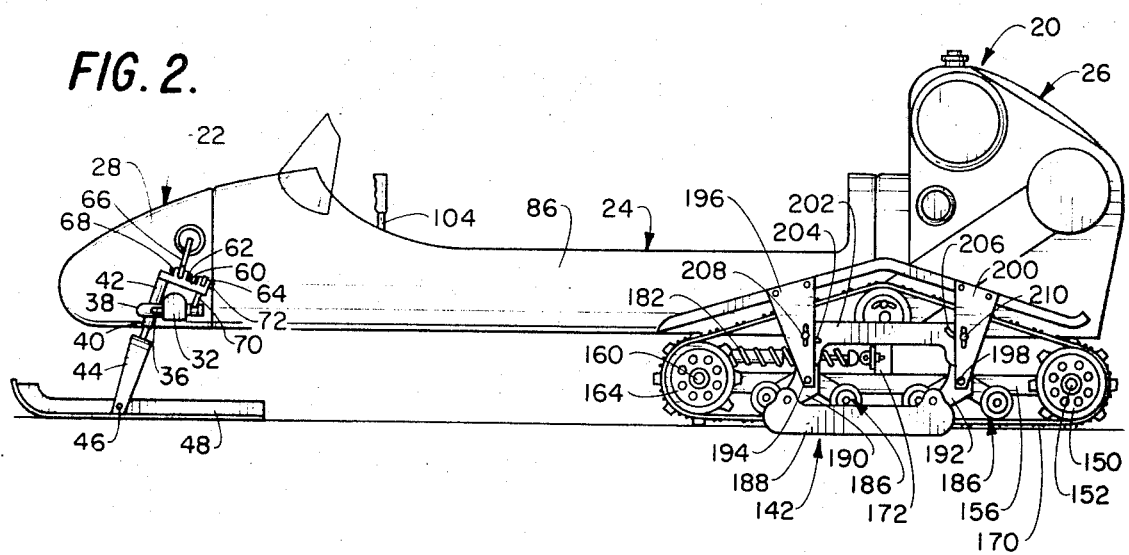
FIG. 2 is a side view of the vehicle of this invention shown in FIG. 1.
Figure 11:
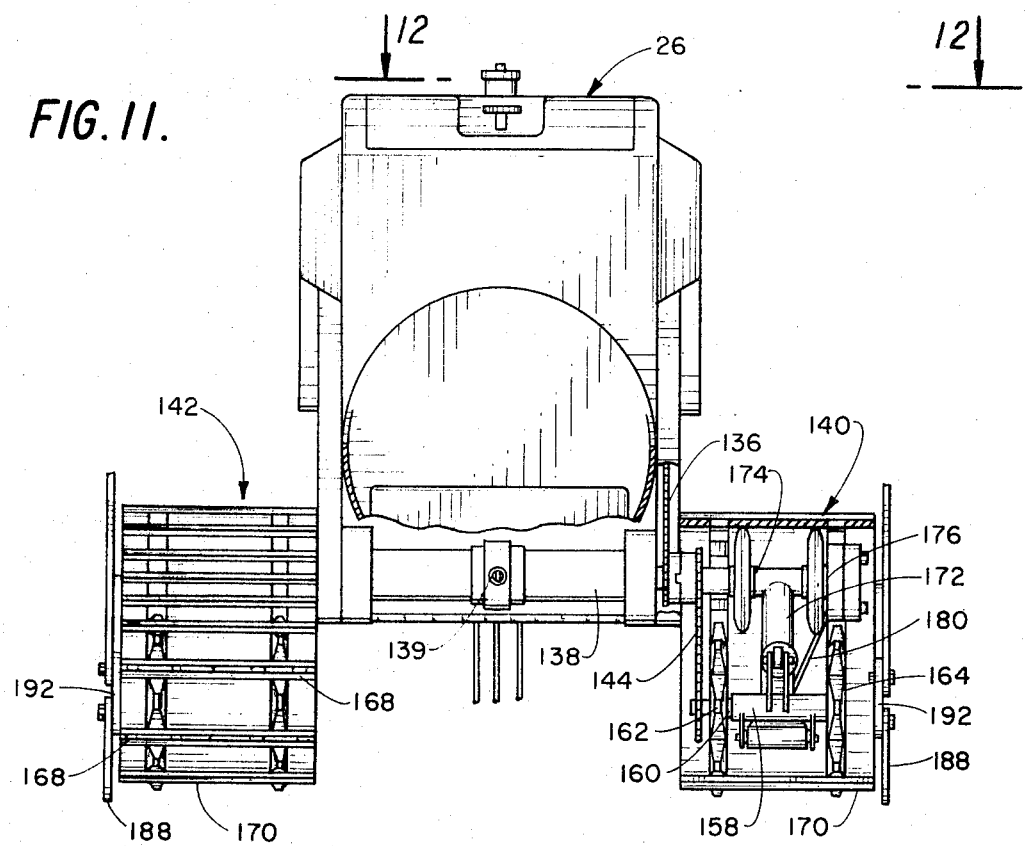
FIG. 11 is a view of the vehicle of this invention with a portion of the motor housing and one of the endless track units being cut away for purposes of illustration taken along line 11—11 of FIG. 10.
Figure 12:
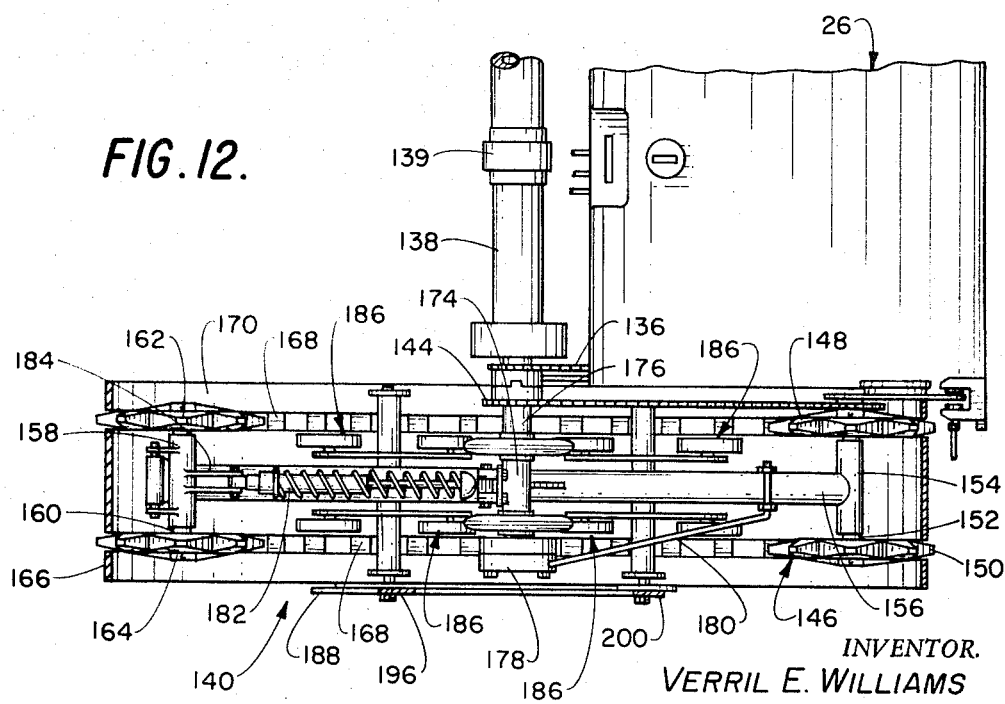
FIG. 12 is a fragmentary, cut-away view of the vehicle of this invention taken along line 12—12 of FIG. 11.

Referring particularly to the drawings, there is shown a snow vehicle 20 of this invention being primarily composed of a front section 22, a passenger compartment 24, and a motor housing 26.

The front or nose section 22 includes a housing 28 with frame members 30 and 32 extending therefrom. The frame members 30 and 32 extend laterally from the front section 22 on each side thereof with the longitudinal axis of each of the frame members 30 and 32 being in an in-line relationship. Actually, each of the frame members 30 and 32 are part of a single element which has been conducted through openings 34 which are formed within the housing 28. The location of the frame members 30 and 32 are fixed with respect to the housing 28.

The following description will relate to a mechanism to effect steering of the vehicle. A similar mechanism will be employed upon each of the frame members 30 and 32. Although only the mechanism associated with the frame member 32 will be depicted in detail, it is to be understood that a similar mechanism is connected to the frame member 30. Like numerals will be employed to refer to like parts between the two mechanisms.

Fixedly secured to frame member 32 and horizontally extending therefrom in a horizontal direction is a pin 36. A sleeve 38 is journalled upon the pin 36. A second sleeve 40 is integrally connected to the first sleeve 38 and extends substantially in a vertical direction, where the sleeve 38 extends substantially in a horizontal direction. A shaft 42 passes through the second sleeve 40 and is connected to a U-shaped bracket 44. Bracket 44 is connected by a bolt 46 to a ski 48.

The free end of the shaft 42 is fixedly secured to an extension 60. Mounted upon the extension 60 are trunnions 62 and 64. A tie rod 66 is pivotally mounted by means of a pin 68 within the trunnion 62. Similarly, a tie rod 70 is pivotally mounted by means of a pin 72 within the trunnion 64. The free end of tie rod 70 is pivotally connected to a bracket 74 which is secured to the frame member 32.

It is to be reiterated that connected to frame member 30 is a similar bracket 74'. Also tie rods 70' and 66' are connected through trunnions to an extension 60'. The foregoing additional structure of the previously described mechanism is also employed including the use of a U-shaped bracket (not shown) being connected to a ski 48'.

Tie rod 66 is conducted through an opening within the housing 28. Similarly, tie rod 66' is conducted within an opening within the housing 28. Each of the tie rods 66 and 66' are conducted through the access opening 76 which is located within plate 78. Plate 78 is substantially circular in configuration and is connected at its circumference to the housing 28. The free ends of each of the tie rods 66 and 66' are fixedly secured as by bolts 80 and 82, respectively, to a plate 84. Plate 84 is also substantially circular in configuration and about the same size as plate 78. Plate 84 is secured at its circumference to housing 86 of the passenger compartment 24. It is to be noted that the connection of the tie rods 80 and 82 are above the center of the plate 84. This is important as will become apparent further on in the description.

Fixedly secured to the plate 84 and located adjacent the periphery thereof are a plurality of low friction roller assemblies 88. With the plate 84 in a closely spaced relationship from the plate 78, as shown in FIG. 3 of the drawings, the roller assemblies 88 are in contact with the plate 78 to permit low frictional relative movement of the housing 86 with respect to the housing 28. A shaft 90 connects together the centers of the plates 84 and 78. The shaft 90 is fixedly secured to the plate 78 with the plate 84 being capable of rotational movement in respect thereto.

Also secured to the shaft 90 and to plate 78 and located directly adjacent the plate 78 is a first gear 92. Gear 92 is to be in operative engagement with a second gear 94. It is to be noted that the radius of the second gear 94 is to be approximately one-half the radius of the first gear 92. The reason for this will become apparent further on in the description.

The second gear 94 is fixedly secured to a shaft 96. Shaft 96 extends in the aft direction within the passenger compartment 24 through a trunnion 98 and is connected to a bracket 100. Trunnion 98 is secured to the housing 86 and permits low frictional rotational movement of the shaft 96 with respect threrto. However, the bracket 100 is capable of pivotable movement about a pin 102 with respect to the housing 86. A control handle 104 is secured to the bracket 100 and is located at substantially a right angle with respect to the shaft 96. However, the control handle 104 is capable of pivotable movement with respect to the shaft 96 in the same manner as bracket 100. Control handle 104 is to be located within the fore portion of a passenger opening 106 located within the housing 86 of the passenger compartment 24.

A first cable 108 is connected to bracket 100 at one end thereof with the opposite end thereof being fixedly secured to a bar 110. The connection of cable 108 to the bar 110 is at approximately the mid-point of the longitudinal length of the bar 110. The bar 110 is located so that the longitudinal axis thereof is approximately a right angle with respect to the longitudinal axis of the vehicle 20. The bar 110 is supported by means of tension springs 112 and 114 with respect to the housing 86. The springs 112 and 114 are so located so as to exert a continuous bias upon the bar 110 tending to move such in the aft direction of the vehicle.

Secured to the longitudinal ends of the bar 110 are a second cable 116 and a third cable 118. Each of the cables 116 and 118 extend forwardly within the housing 86 and are secured to a bar 120. Bar 120 is pivotably mounted by means of a stanchion 122 at approximately its longitudinal mid-point with respect to the housing 86. The free ends of each of the cables 116 and 118 are each to be connected to a brake within the drive means which will be described further on in the description. The foregoing arrangement is such that upon a person pulling back on the control handle 104, the forward movement of the bar 110 against the action of the springs 112 and 114 occurs. Because the brake cables 116 and 118 are secured to the bar 110, simultaneous actuation of the dual brake assembly located within the drive means is effected. However, if it is desired to effect individual actuation of the brake means so as to facilitate steering of the vehicle, a person may selectively, as by means of a foot, effect pivotable movement of the bar 120 in either the clockwise direction or the counterclockwise direction. In the clockwise direction, forward movement of cable 118 occurs which will effect actuation of one of the brakes. In the counterclockwise direction, forward movement of the cable 116 occurs which effects actuation of the other brake.

Mounted within the passenger opening 106 and secured to the housing 86 is a dual passenger seat 124. This dual type of seat 124 permits carrying up to two persons.

A plate 126 closes off the aft end of the housing 86 in the same manner as previously described plate 78 and 84. A opening is centrally located within the plate 126 and is adapted to receive a pin 128 therethrough. A nut type of fastener is to facilitate connection of the pin 128 with respect to the plate 126.

The forward end of the motor housing 126 is similar in configuration to the aft end of the housing 86 and is similarly closed off by means of a plate 130. A plurality of roller assemblies 132 are mounted upon the plate 130 in a manner similar to the mounting of roller assemblies 88. Pin 128 is fixedly secured to the plate 130 at its center point thereof. In a similar manner as was previously described, with the plates 126 and 130 in a closely spaced relationship, the roller assemblies 132 are in contact with the plate 126 and facilitate low frictional pivotal movement of the housing 86 with respect to the motor housing 26. The securing of the pin 128 by means of the nut 134 prevents accidental undesired separation of the motor housing 26 with respect to the housing 86.

Located within motor housing 26 is a motor such as a gasoline powered internal combustion type of engine. However, it is to be understood that other types of engines or motors could be readily employed. The motor (not shown) is to emit a rotational torque which is transmitted through a chain 136 to effect rotation of a sprocket assembly. Tube 138 is fixed to the motor housing 26. The rotational movement of the sprocket assembly is transmitted to endless track assemblies 140 and 142 which are laterally located on each side of the motor housing 26. It is to be understood that each of the endless track assemblies 140 and 142 are substantially identical in construction and in operation. Therefore, the description of the endless track assemblies will be confined to one track assembly with it being understood that such description also being applicable to the other track assembly.

The sprocket assembly 176 operates through a chain 144 to effect rotation of a rear rider wheel assembly 146. Rear rider wheel assembly 146 includes a pair of spaced apart wheels 148 and 150. A shaft 152 connects together wheels 148 and 150. A sleeve 154 surrounds the shaft 152 in between the wheels 148 and 150.

A brack 156 is connected between the sleeve 154 and a sleeve 158. Sleeve 158 surrounds shaft 160 upon which are rotatably supported wheels 162 and 164 of a front rider wheel assembly 166. The wheels 148, 150, 162 and 164 each include teeth which are to engage cleats 168 which are formed within the belt type of endless track 170.

At approximately the mid-point of the longitudinal length of the brace 156 is fixedly secured an upright stanchion 172. The stanchion 172 is connected to a sleeve 174 which surrounds a shaft 176. Shaft 176 is fixed to the tube 138 at one end thereof and is connected to a plate 178 at the opposite end thereof. A torsion rod 180 connects together the brace 156 and the plate 178 in order to resist rotation of the brace 156 in either direction about the shaft 138. The force of the torsion rod 180 can be made adjustable to exert a normal bias in either direction.

The front rider wheel assembly 166 is biased forwardly by means of a spring 182 so as to maintain the endless track 170 continuously in a taut arrangement. Spring 182 operates between an arm 184 connected to the sleeve 158 and the upright stanchion 172.

Bogie wheel assemblies 186 are pivotally mounted upon the brace 156 and are adapted to be in contact with the endless track 170. The function of the bogie wheel assemblies 186 is to maintain the endless track 170 in contact with the terrain upon which it is moving.

Associated outboard of each of the endless track assemblies 140 and 142 is an anti-skid plate 188. Each of the skid plates 188 are connected to arms 190 and 192. Arm 190 is connected through a pivot pin 194 to a fixed plate 196. Arm 192 is connected through a pivot pin 198 to a fixed plate 200. The free end of arm 190 is connected to adjusting palte 202. The free end of arm 192 is also connected to adjusting plate 202. Formed within adjusting plate 202 are spaced apart arcuate slots 204 and 206. A fastener 208 connects plate 196 with slot 204 and similarly a fastener 210 connects slot 206 with plate 200.

The side plates 188 tend to prevent lateral sliding movement when the vehicle is traversing laterally across an incline. The plates 188 are to be in contact with the snow covered terrain, such contact being variable by the slots 204 and 206 and moving of the adjusting bar 202. Arms 190 and 192 can be pivoted about their respective pivot pins 194 and 198. This effects an up and down movement of the side plate 188. In this manner the side plate 188 can be adjusted to penetrate deeply loose fallen snow, or adjusted to penetrate only slightly hard packed snow.

Let it be assumed that an operator is effecting operation of the vehicle of this invention with the motive power being supplied by means of the endless track assemblies 140 and 142. Let it now be assumed that the operator desires to turn to the right. The operator then pivots the control handle 104 to the right which causes the gear 94 to be rotated about gear 92. Since gear 92 is fixed, the housing 86 is caused to pivot in respect to the front section 28 and the motor housing 26. This pivoting is also to the right so as to move the center of gravity of the combined passenger and passenger compartment 24 to the right to resist tipping over of the vehicle when making a right-hand turn.

It is to be noted that the operator may facilitate the right-hand turning movement by application of the brake on the right endless track assembly 142. This application of the brake is accomplished by the operator applying foot pressure to the right side of bar 120.

As the passenger compartment 24 is pivoted to the right, tie rod 66' is extended with tie rod 66 being withdrawn. This withdrawing of the tie rod 66 causes the shaft 42 to be pivoted in respect to the pin 36. This results in an outward tilting of the ski 48. Additionally, the withdrawing of the tie rod 66 is resisted by tie rod 70. This resistance coupled with the withdrawing action results in a pivoting of the ski 48 to the right. Through a similar type of action the pivoting and tilting of the ski 48' occurs.

If the control handle 104 is moved to the left, the reverse occurs which causes the skis 48 and 48' to tilt in the opposite direction and also to be pivoted to the left. For a detailed description of this turning action, reference may be had to U.S. Pat. No. 3,361,436, issued Jan. 2, 1968, by the inventor of the present application.

One feature of this invention which is not readily apparent from the foregoing is that the motor housing 26 may be readily detachable by only the loosening of nut 134 from the passenger compartment 24 and the removal of pin 139. This facilitates the securing of other types of propelling drive units to the passenger compartment 24 or a non-propelling type of unit. For example, the propelling units could be attached to the non-propelling sled depicted within U. S. Pat. No. 3,361,436.

Other advantages of the vehicle of this invention are that portability is facilitated for ease of carrying and storing. The overall vehicle is also quite light in weight yet highly stable than previous types of vehicles. As a result, the vehicle of this invention is quite ideal for rescue work in rough steep terrain. The vehicle of this invention can be readily stowed aboard light aircraft whereas it is virtually impossible to do so with the present snowmobiles.

The detachable power unit from the vehicle of this invention can be applied in other applications such as lawn mowers, garden plows, pulling carts, small wagons, etc.

I claim:

1. A vehicle comprising:
    a front section and a passenger compartment and a motor housing connected together in an in-line relationship, said motor housing including motor means to propel said vehicle, said passenger compartment being pivotally connected to said motor housing and located forwardly thereof, said front section being pivotally connected to said passenger compartment and located forwardly thereof, the planes of pivotal movement of said passenger compartment being substantially parallel, said front section being supported in respect to the ground by a pair of spaced apart ski elements;
    control means mounted within said passenger compartment, said control means being connected to said passenger compartment through a gearing assembly, said control means being manually movable to effect pivoting of said passenger compartment; and
    a steering mechanism included within said front section and interconnecting said control means and said ski elements, movement of said control means causes tilting and turning of said ski elements and simultaneous pivoting of said passenger compartment through said gearing assembly.

2. A vehicle as defined in claim 1 wherein:
    said motor housing being readily detachable from said passenger compartment thereby facilitating substitution of motor housings.

3. A vehicle as defined in claim 1 wherein:
    said control means including a shaft, said shaft being pivotable relative to said passenger compartment.

4. The vehicle as defined in claim 3 wherein:
    said gearing assembly comprising a gear reduction mechanism wherein the amount of angular movement of said passenger compartment is equal to one-half of the angular movement of said control means.

5. A vehicle as defined in claim 1 wherein:
    brake means connected to said motor means, actuating means to effect operation of said brake means, said actuating means being located within said passenger compartment.

6. A vehicle as defined in claim 5 wherein:
    said brake means includes a pair of spaced apart braking elements, each of said braking elements being actuatable independently.

* * * * *